United States Patent [19]

Perry

[11] Patent Number: 5,016,915

[45] Date of Patent: May 21, 1991

[54] CHILD RESTRAINT FOR USE WITH A SEAT BELT IN AN AUTOMOBILE

[76] Inventor: Pauline R. Perry, 1814 Dee Ave., Columbus, Ga. 31903

[21] Appl. No.: 550,300

[22] Filed: Jul. 9, 1990

[51] Int. Cl.$^5$ .............................................. B60R 22/00
[52] U.S. Cl. .................................. 280/801; 280/808; 297/482
[58] Field of Search ................. 280/801, 808; 297/482

[56] References Cited

U.S. PATENT DOCUMENTS

| 4,595,618 | 6/1986 | Caringer | 280/801 |
| 4,619,468 | 10/1986 | Spill | 280/801 |
| 4,758,020 | 7/1988 | Boyd | 280/801 |

FOREIGN PATENT DOCUMENTS 2342188 9/1977 France .............................. 297/482

OTHER PUBLICATIONS

"Buckle-Up Buddy", Instructions, 4 pages, 1986.

*Primary Examiner*—Kenneth R. Rice
*Attorney, Agent, or Firm*—Donald J. Breh

[57] ABSTRACT

A child restraint for use with an automobile seat belt including an elongated cushion having attachment loops for attachment to a seat belt and sized to engage about a child filling voids between the child, the seat and the seat belt on opposite sides of the child.

9 Claims, 2 Drawing Sheets

CHILD RESTRAINT FOR USE WITH A SEAT BELT IN AN AUTOMOBILE

BACKGROUND OF THE INVENTION

This invention relates to safety devices. More particularly, the invention relates to a child restraint for use with a seat belt in an automobile.

It is known that the typical seat belt used in an automobile does not provide proper protection of young children and in particular children of ages below five years. One primary reason that the common automobile seat belt in use today is not effective in properly restraining children of these ages is that the size of these children principally in regard to the width of the child at his or her waist or lap area whereat a seat belt would be disposed is substantially less than the spacing between the attachment points of the seat belt to the seat resulting in gaps, voids or spaces between the child, the belt and the seat on opposite sides of the child. As a result, contact of the belt fully around the child from side to side is not achieved resulting in no side-to-side or lateral support of the child. Added to this, is the fact that children of these young years are not always capable of fully supporting themselves and, as a result, they can easily and inadvertantly twist or become cocked between the belt and the seat and even slip out from beneath the belt due to the lack of full restraint and lateral support.

Knowing this to be a principal shortcoming of the common adult seat belt in today's automobiles, numerous infant or child seats have been devised which usually are independantly attached to the car seat by way of the seat belt and the child is in turn placed in the auxilliary seat and restrained by the specially adapted seat which provides the needed lateral support. While these car seats are effective in properly securing, restraining and protecting young children, they are bulky, heavy, generally unwieldly and require removal and storage when not needed so as to make room for adult passengers. Accordingly, it would be desirable, and is an object of the present invention, to provide for a child restraint which provides for restraint and safety of young children but which is further easily removed and stored when not needed and which is easily re-attachable to the vehicle when required.

SUMMARY OF THE INVENTION

According to the invention, there is provided an elongated cushion adapted to extend about the waist area of a young child between the seat on opposite sides of the child and which is attachable to the common seat belt associated with the seat and which is adapted to fill voids otherwise disposed between the child, the belt and the seat on opposite sides of the child.

According to an important feature of the invention, the elongated cushion is a pillow-like member encased in a cloth casing and having means for removably attaching an automobile seat belt to the cushion.

According to the invention, the means for attaching the seat belt to the cushion includes at least one belt loop-like attachment to an outer surface of the cushion.

According to a still further important feature of the invention, the cushion has a thickness adapted to substantially completely fill void spaces on opposite sides of the child between the seat, the child and the belt.

BRIEF DESCRIPTION OF THE DRAWINGS

The invention will be better understood after reading the following Detailed Description of the Preferred Embodiment in conjunction with the drawings of which.

DETAILED DESCRIPTION OF THE PREFERRED EMBODIMENT

Shown in FIGS. 2-6 is a child restraint 10 for use with a seat belt 20 associated with a seat 13 of an automobile. The restraint 10 is adapted, as described below, to be easily attachable and removable from the seat belt 20 for use as needed or for storage or easy transfer to another vehicle.

Figure 1:
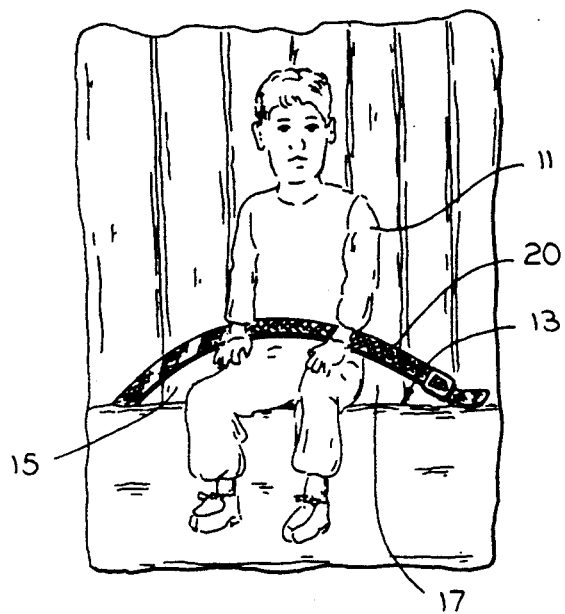
FIG. 1 is a front elevational view of an automobile seat showing a typical seat belt in use fastened about a child seated on the seat showing voids on either side of the child.

The restraint 10 is adapted and was designed to overcome the shortcomings of the typical seat belt arrangement 20 found in an automobile in regard to such belts ineffectiveness in properly restraining and supporting a child of young years and principally children of from about one to about five years of age which are not only small in size but lack sufficient body strength to support themselves in an upright or normal seated position. As shown in FIG. 1, the typical seat belt arrangement in an automobile has attachment locations spaced apart substantially greater than the width of young children leaving voids, or spaces 15, 17 between the child, the seat, and the seat belt on opposite sides of the child. These voids 15, 17 prevent proper lateral support of the child and allow the child, especially very young children not capable of supporting themselves, to twist and turn within the belt. The child can become cocked, fall over sideways and even slip out from under the belt which obviously s undesirable and unsafe. The restraint 10 according to the invention overcomes these shortcomings by providing padded means which fill the voids 15, 17 between the child, the seat and the typical seat belt to provide lateral stability and support.

Figure 2:
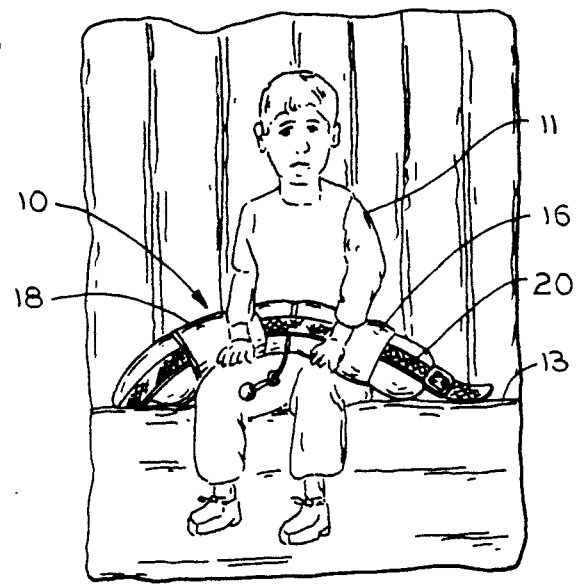
FIG. 2 is a front elevational view of the automobile seat of FIG. 1 showing the child restraint according to the invention in use with the typical seat belt fastened about the child.
Figure 3:
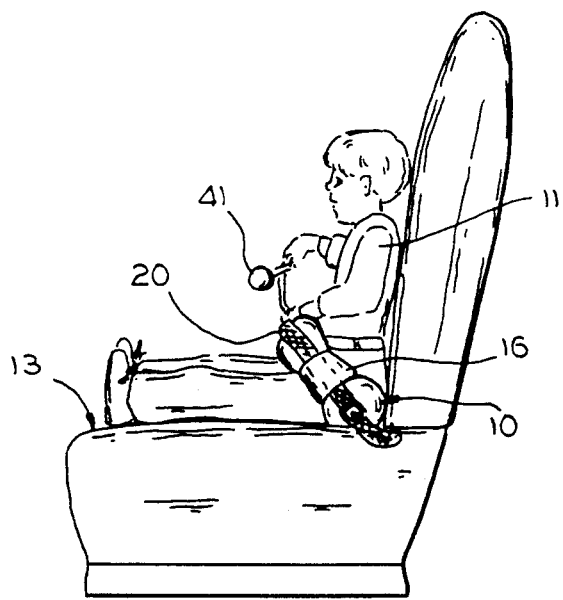
FIG. 3 is a side elevational view of the automobile seat of FIG. 2 showing further details of the child restraint according to the invention in use pulled completely around the child against the seat.
Figure 4:
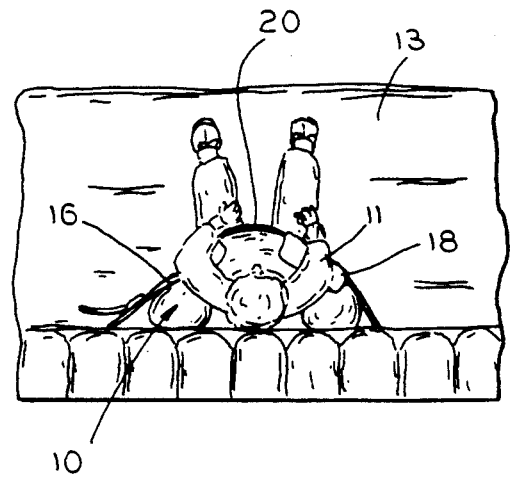
FIG. 4 is a top elevational view of the automobile seat of FIG. 2 showing further details of the child restraint according to the invention in use.
Figure 5:
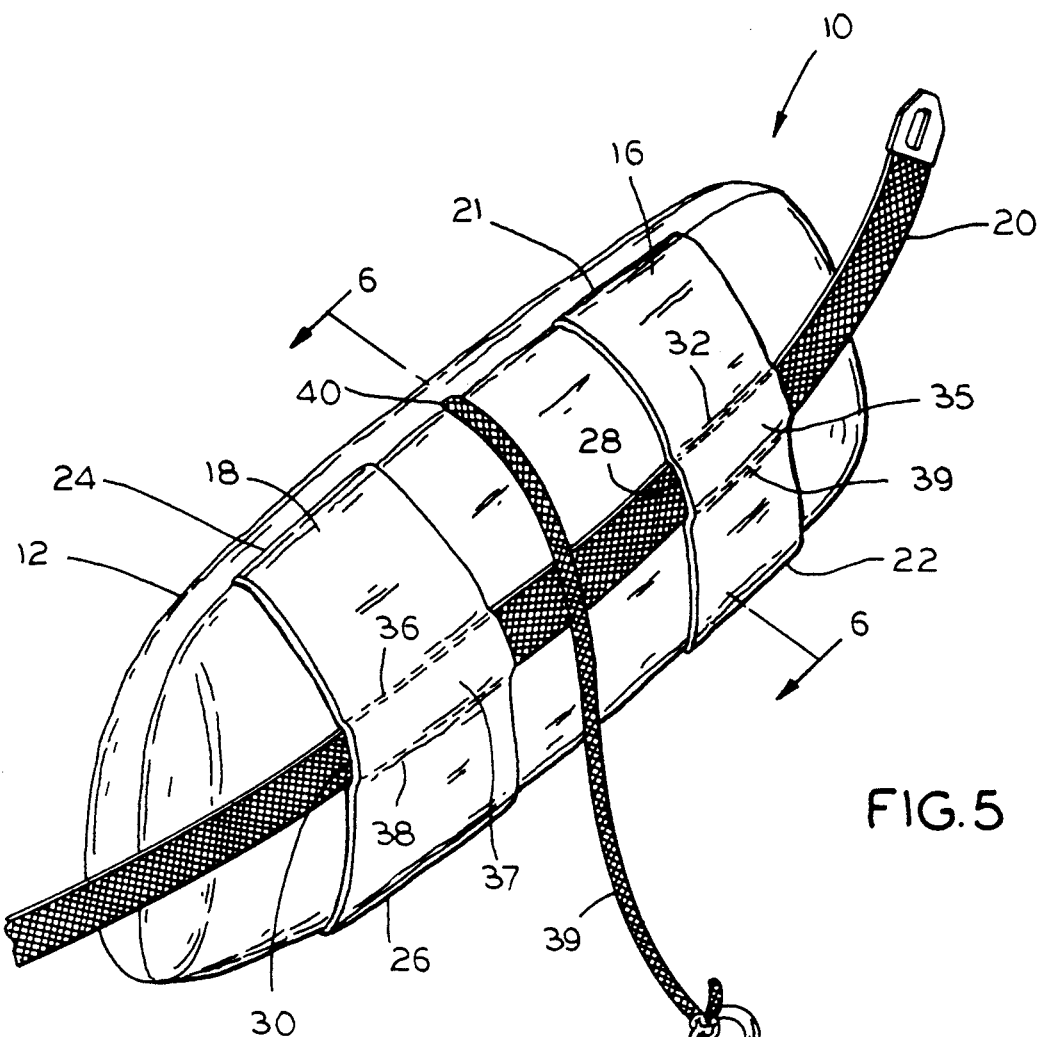
FIG. 5 is a pictorial view of the child restraint according to the invention showing details of construction.
Figure 6:
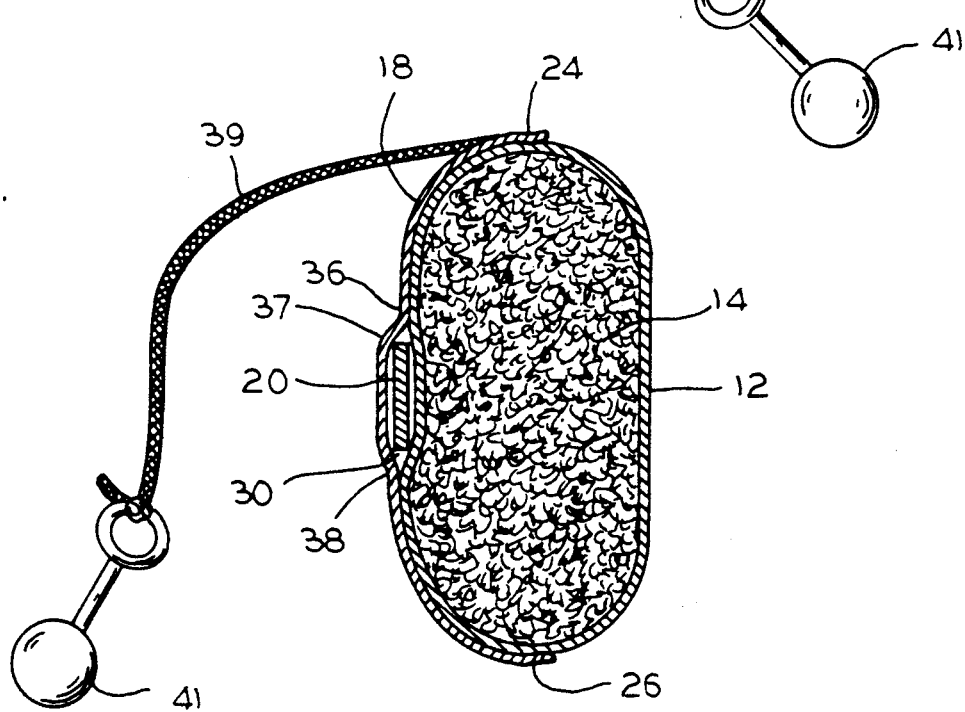
FIG. 6 is a vertical transverse cross sectional view taken along the line 6—6 in FIG. 5 showing further details of construction.

As shown in FIGS. 5 and 6, the restraint 10 includes a pillow like cushion 14 which is preferrably made from one of the common pillow stuffings such as a synthetic material or even feathers if desired. The cushion 14 is encased in a cloth-like covering or casing 12. The encased cushion has a length which provides for extending across substantially the entire width of the child when seated in the seat between the seat 13 on opposite sides of the child when placed across child's lap or waist area. It has been found that a length of about 20"-24" is satisfactory for meeting this criteria for the majority of children within the age group with which the restraint will be used. The width of the cushion, that is, the dimension from the top to the bottom of the cushion, should be sufficient to provide both forward and lateral restraint and support to the child. A width on the order of about 10"-12" has been found to be satisfactory. It is to be understood, however, that these dimensions are only representative of preferred or satisfactory sizes and are not to be considered as limitations to the invention. The thickness of the cushion 14, that is, the dimension from the front surface to the rear surface of the cushion, must be sufficient to substantially fill the voids or spaces 15, 17 between the child 11, the seat 13 and the seat belt 20 when the restraint is secured around the child at the child's lap or waist area with the belt tightened firmly. Depending on the child's size, the cushion is squeezed into or otherwise substantially fills the voids 15, 17 when the belt 20 is drawn firmly around the child as shown in FIGS. 2-4.

The casing 12 is provided with seat belt attachment means in the form of at least one and preferrably at least two belt loop-type attachments. The attachment loops include a pair of cloth members 16, 18 sewed at the top and bottom edges of the casing at seams 21, 22 and 24, 26 respectively. The attachment members are each additionally sewed longitudinally and centrally to the front surface of the casing as shown in FIG. 5 at seams 32, 34 and 36, 38 which form a pair of seat belt receiving loops or apertures 28, 30.

As shown in the drawings, the restraint is easily attached to the seat belt by threading the belt through the belt loops 28, 30. The restraint can be left attached to the seat belt when not in use and is quickly positionable and firmly engagable against the child when needed. When required, the restraint can be quickly removed from the belt and it's limited size lends to easy storage within the vehicle without consuming large amount of space.

As shown in FIGS. 5 and 6, if desired, the restraint can be attached to hold a child's toy or novelty item 41 by including, for example, a flexible strap 39 attached to the cushion at the top seam 40. Other techniques to fasten the strap 39 can be provided by including, for example, a VELCRO type fastener on the cushion case and strap which would provide for easy and fast removal and re-attachment of the strap as desired.

Having described the preferred embodiment of the invention, those skilled in the art having the benefit of that description and the accompanying drawings can readily devise other embodiments and modifications and such other embodiments and modifications are to be considered to be within the scope of the appended claims.

What is claimed is:

1. A child restraint for use with a seat belt in an automobile comprising:
   an elongated pillow-like cushion;
   means for attaching said pillow-like cushion to said seat belt associated with a seat of the automobile, said means for attaching adapted to hold said pillow-like cushion against said child when seated in said seat in a fastened position of said seat belt, said pillow-like cushion having a length adapted to extend across said child from said seat on opposite sides of said child in the fastened position of the seat belt.

2. The child restraint as claimed in claim 1 wherein said pillow-like cushion has a thickness at least at locations proximate ends of the cushion adapted to fill voids at opposite sides of the child between said seat belt, said seat and said child.

3. The child restraint as defined in claim 1 wherein said means for attaching includes at least one transverse seat belt loop across at least a portion of a frontal surface of the cushion for receiving said seat belt therethrough.

4. The child restraint as defined in claim 1 further including means for attaching a child's toy to said cushion at a central location along the length of the cushion.

5. A child restraint for use with a seat belt in an automobile comprising:
   an elongated pillow-like cushion including means for attaching said cushion to the seat belt to be held against the child seated on a seat associated with said seat belt in a fastened position of said seat belt, said cushion having a length and a thickness adapted to extend transversely completely across the child proximate a lap area of the child between the seat on opposite sides of the child and to substantially completely fill spaces between said seat belt, said seat and said child on said opposite sides of said child with said seat belt in the fastened position.

6. The child restraint as defined in claim 5 wherein said means for attaching includes a longitudinal pocket along a frontal surface of the cushion.

7. A child restraint for use with a seat belt in an automobile comprising:
   a cloth-like casing;
   an elongated cushion encased in said casing, said casing having means on one surface for attaching said seat belt to said casing and to hold said encased cushion against a child seated on a seat associated with the seat belt in a fastened position of the seat belt, said encased cushion having a length adapted to extend across the child generally at a lap area of the child from the seat on one side of the child to the seat on an opposite side of the child in the fastened position of the seat, said encased cushion further having a thickness adapted to fill spaces on opposite sides of the child between said seat belt, said seat and said child in the fastened position of the seat belt.

8. The child restraint as defined in claim 7 wherein said cloth-like casing has a rectangular shape and at least one transverse cloth-like belt loop-like member on a frontal surface defining an attachment loop for receiving said seat belt there through longitudinally across said frontal surface.

9. The child restraint as defined in claim 8 wherein said attachment means includes a pair of spaced apart belt loop-type members attached to said casing extending transversely across said frontal surface.

* * * * *